(12) United States Patent
Schneider

(10) Patent No.: US 7,836,048 B2
(45) Date of Patent: Nov. 16, 2010

(54) SOCIALLY-DERIVED RELEVANCE IN SEARCH ENGINE RESULTS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 409 days.

(21) Appl. No.: 11/986,232

(22) Filed: Nov. 19, 2007

(65) Prior Publication Data

US 2009/0132517 A1   May 21, 2009

(51) Int. Cl.
*G06F 17/30* (2006.01)
(52) U.S. Cl. .................................. 707/725; 707/727
(58) Field of Classification Search .................. 707/3, 707/725, 727
See application file for complete search history.

(56) References Cited

U.S. PATENT DOCUMENTS

| 2008/0059258 A1* | 3/2008 | Lee ................................. 705/7 |
| 2008/0154856 A1* | 6/2008 | Riise et al. ....................... 707/3 |
| 2009/0171746 A1* | 7/2009 | Lee et al. ....................... 705/10 |

OTHER PUBLICATIONS

Sugayama et al., "Refinement of TF-IDF schemes for web pages using their hyperlinked neighboring pages", Fourteenth ACM conference on Hypertext and hypermedia, Aug. 2003, p. 198-207. Retrieved from the Internet:<URL: http://portal.acm.org/ft_gateway.cfm?id=900096&type=pdf&coll=ACM&dl=ACM&CFID=95418512&CFTOKEN=48371193>.*

Lempel et al., "Optimizing result prefetching in web search engines with segmented indices", ACM Transactions on Internet Technology, vol. 4 , Issue 1 (Feb. 2004), p. 31-59. Retrieved from the Internet:<URL:http://portal.acm.org/ft_gateway.cfm?id=967032&type=pdf&coll=ACM&dl=ACM&CFID=95418512&CFTOKEN=48371193>.*

* cited by examiner

*Primary Examiner*—Jean B. Fleurantin
*Assistant Examiner*—Dennis Myint
(74) *Attorney, Agent, or Firm*—Blakely, Sokoloff, Taylor & Zafman LLP

(57) ABSTRACT

A method and apparatus for ranking results from a search engine query is described. In one embodiment, a search engine generates a list of search results in response to a query for a search term to the search engine. A statistical computation engine determines an average frequency of first selection of each hyperlink with respect to its position in a list of hyperlinks, and determines an average frequency of first selection of each search result from the list of search results. A relevance engine compares the average frequency of first selection of a search result from the list of search results with the average frequency of first selection of a corresponding hyperlink in the respective position in the list of hyperlinks, and adjusts the position of the search result in the list of search results based on the comparison.

18 Claims, 5 Drawing Sheets

SOCIALLY-DERIVED RELEVANCE IN SEARCH ENGINE RESULTS

TECHNICAL FIELD

Embodiments of the present invention relate to a search engine, and more particularly, to improving search engine results.

BACKGROUND

Search engines that use link popularity to rank web sites tend to skew their results in favor of web sites that are more popular. Google uses an algorithm called PageRank that assigns a numerical weighting to each element of a hyperlinked set of documents to measure its relative importance within the set. PageRank results from voting among all other web pages about how important a web page is. A hyperlink to a page counts as a vote of support. Similarly, a web page that is linked to by many pages with high PageRank receives a high rank itself. If there are no links to a web page, there is no support for that web page.

Further, search engine rankings also influence consumer behavior. For instance, most users only click on the first result in a list of search results generaged by a search engine. Most users do not look past the first result in the list. As such, search engines that rank results with click-through popularity very soon wind up with links that are effectively permanent in the first few positions.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for ranking results from a search engine query is described. In one embodiment, a search engine generates a list of search results in response to a query for a search term to the search engine. A statistical computation engine determines an average frequency of first selection of each hyperlink with respect to its position in a list of hyperlinks, and determines an average frequency of first selection of each search result from the list of search results. A relevance engine compares the average frequency of first selection of a search result from the list of search results with the average frequency of first selection of a corresponding hyperlink in the respective position in the list of hyperlinks, and adjusts the position of the search result in the list of search results based on the comparison.

Figure 1:
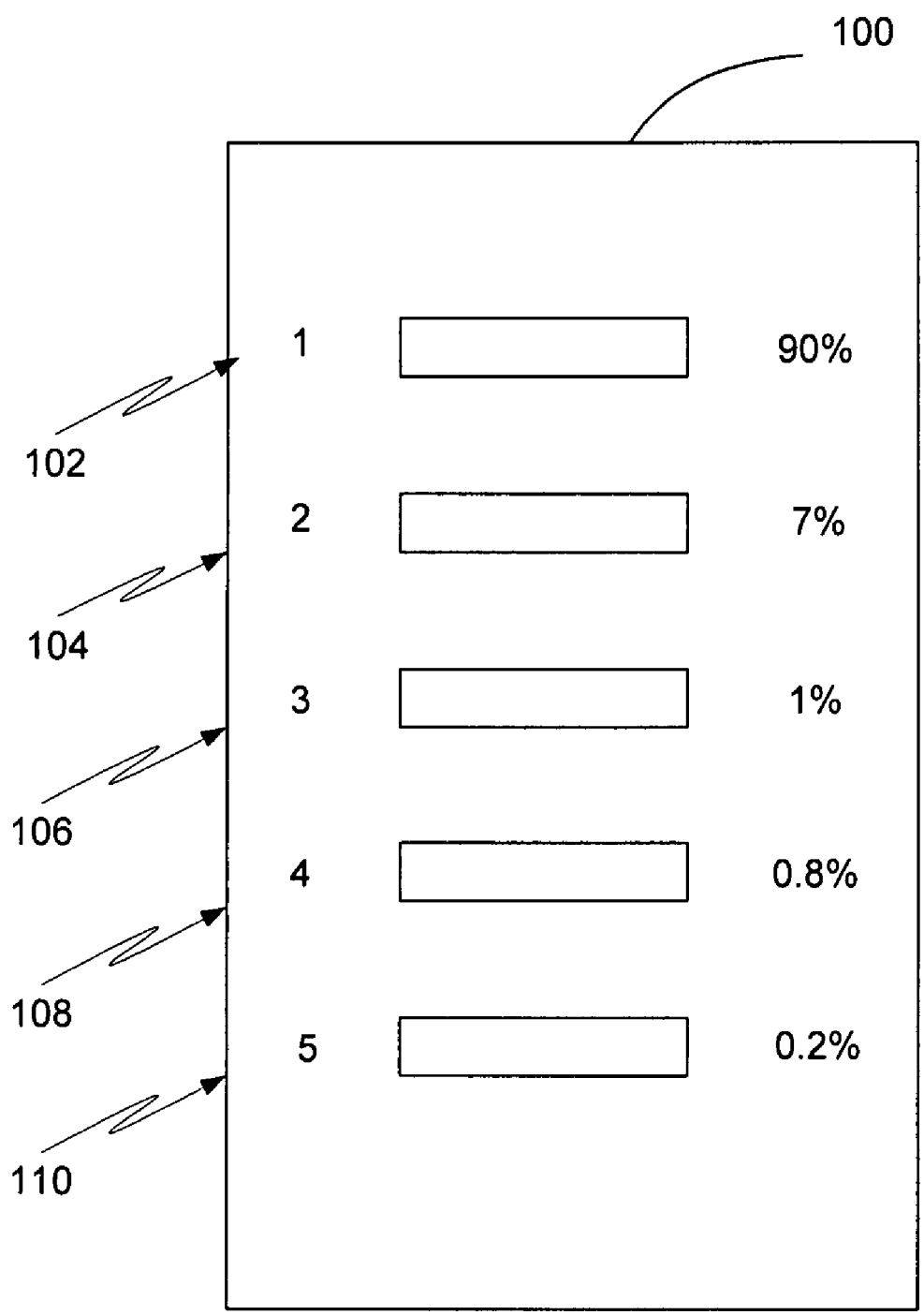
FIG. 1 is a block diagram illustrating an example of a list of search results with an average click-through for each position in the link.

FIG. 1 is a block diagram illustrating an example of a list 100 of search results with an average click-throughs at each list position calculated globally. The list 100 may be the results of any search query in a search engine. Typically, the list 100 includes several links 102, 104, 106, 108, and 110 ordered from the most relevant to the least relevant.

For example, the first link 102 may be the most relevant link in the list 100. Most users click on the first result in the list of search results. A global click-through average for the first link may be for example 90%. The second most relevant result, link 104 may have a global click-through average of about 7%. The third most relevant result, link 106 may have a global click-through average of about 1%. The fourth most relevant result, link 108 may have a global click-through average of about 0.8%. The fifth most relevant result, link 110 may have a global click-through average of about 0.2%. In other words, a link located in the fifth position of a list of search results from a search engine has a 0.2% probability of being the first one to be clicked on in the list.

In one embodiment, these statistical data may be the result of some prior or concurrent analysis of global click-throughs from lists of search results with respect to any search term.

Figure 2:
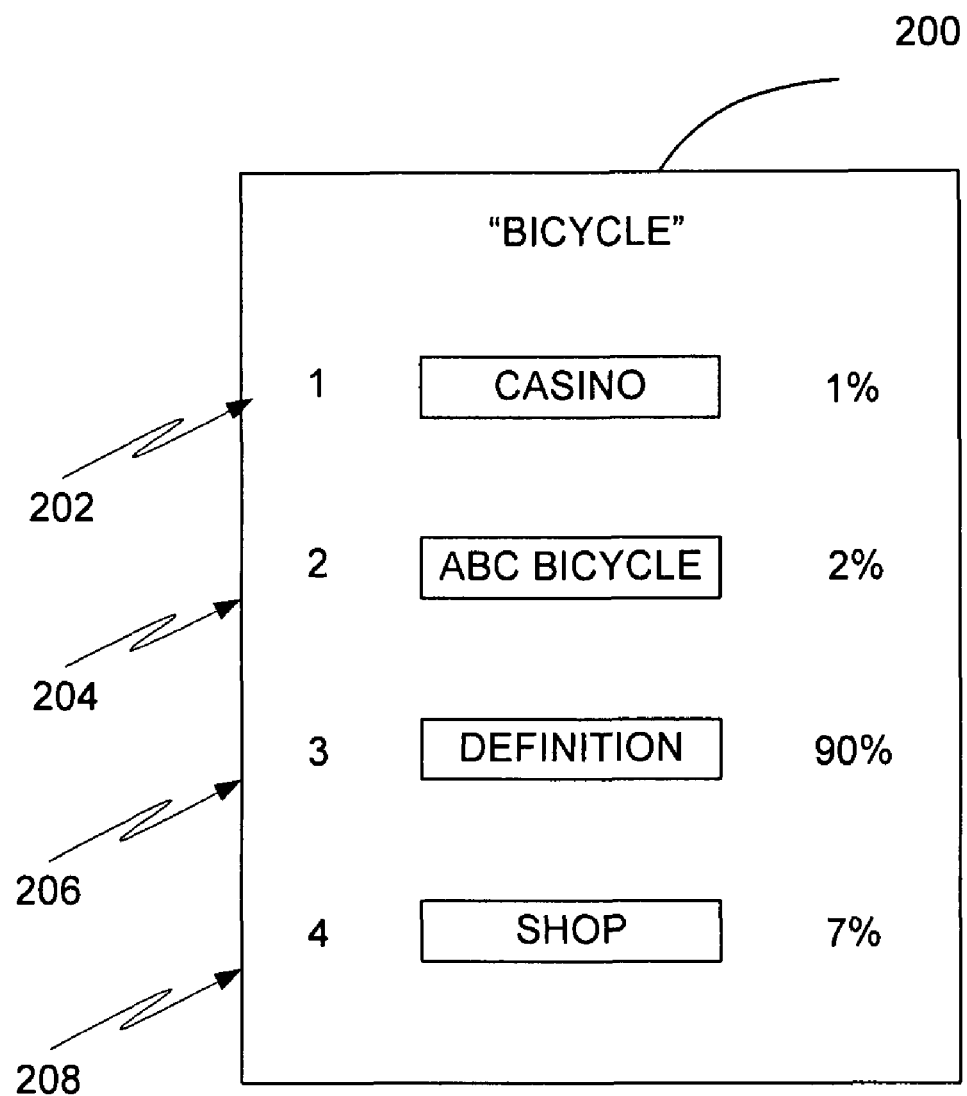
FIG. 2 is a block diagram illustrating an example of a list of search results for a search term.

FIG. 2 is a block diagram illustrating an example of a list 200 of search results for a search term. The list 200 is generated as a result from a search query on a search engine. For example, a user may search the term such as "bicycle". The search engine generates the list 200 with the following search results in order of relevancy (most relevant to least relevant): "casino" 202, "abc bicycle inc." 204, "definition of bicycle" 206, "shop for bicycle" 208.

The first click-through average for each search result is computed based on statistical analysis. For example, "casino" 202 may have a first click-through average of 1% from the list 200. In other words, the search result "casino" 202 has a 1% probability of being the first link to be clicked on after being presented to a user in the list 200 regardless of its order. Similarly, "abc bicycle inc." 204 may have a first click-through average of 2% from the list 200. The search result "definition of bicycle" 206 may have a first click-through average of 90% from the list 200. The search result "shop for bicycle" 208 may have a first click-through average of 7% from the list 200.

By comparing the global average frequency of click-throughs at each list position with the average frequency of first click-throughs of each search result in the list 200, the search results may be adjusted to enhance relevancy based on the statistics from user interactions. Any search result with significant deviations from the norm can be identified, the results can be re-ordered. For example, the search result "casino" 202 with a first click-through average of 1% is ranked too high to be listed in the first position since the first position has a click-through of, for example, 90% as illustrated in FIG. 1. As such the search result "casino" 202 needs to be re-ordered accordingly and be listed further down on the list 200.

Figure 3:
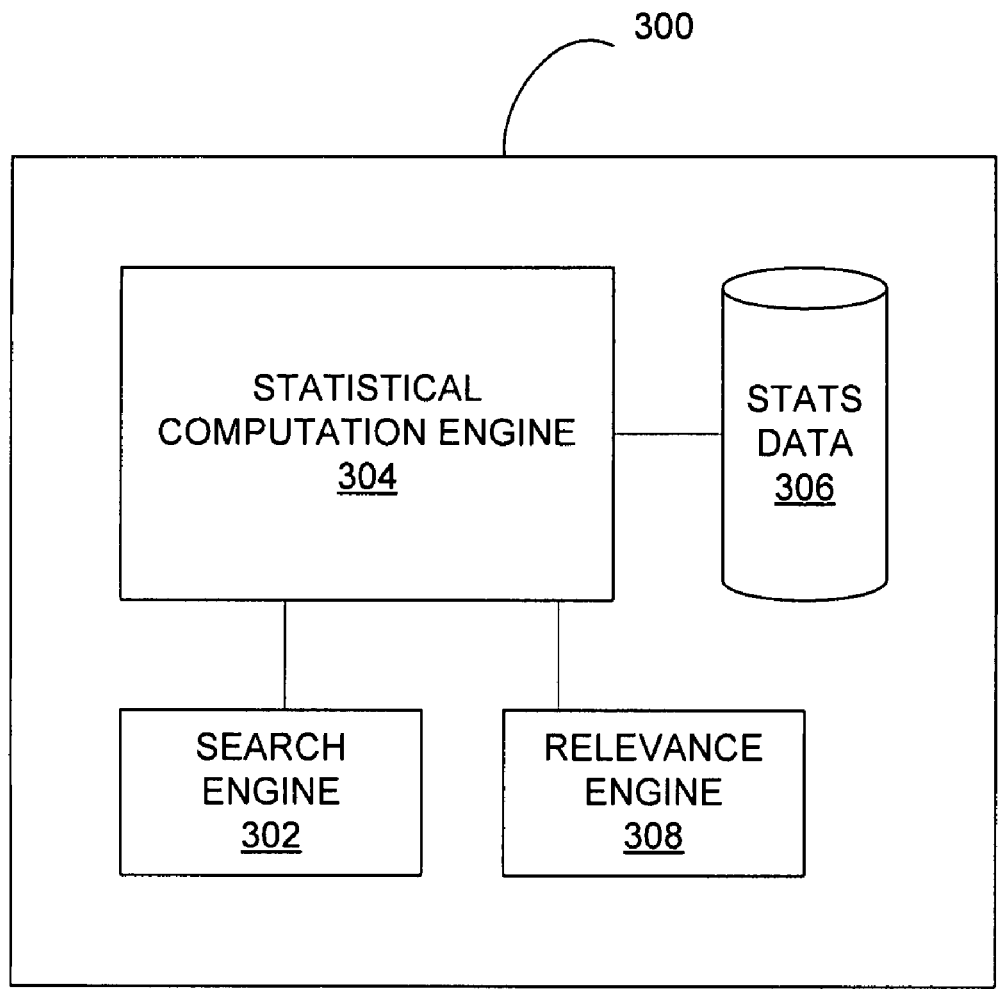
FIG. 3 is a block diagram illustrating one embodiment of a socially-derived search engine.

FIG. 3 is a block diagram illustrating one embodiment of a socially-derived search engine 300. The socially-derived search engine 300 has at least three components: a search engine 302, a statistical computation engine 304, a database 306, and a relevance engine 308.

The search engine 302 generates a list of search results in response to a query for a search term to the search engine 302. Those of ordinary skills in the art will recognize that search engine may include a variety of searching algorithm that includes "popularity" of web sites to generate search results. The search results may include a list of brief description or quotation of the websites and a corresponding hyperlink for the user to click to. The list may be ordered from most relevant to least relevant according to the search engine.

A statistical computation engine 304 determines the average frequency of first selection of a hyperlink with respect to its position in a list of hyperlinks. Statistical computation engine 304 also determines the average frequency of first selection of the search result from the list of search results. Statistical computation engine 304 performs these statistical analysis based on the collected statistical data in database 306. The collected statistical data may include but is not limited to the ordered listing of presented links, which links were clicked on, in which order, and time between clicks.

The relevance engine 308 compares the average frequency of first selection of the search result from the list of search results with the average frequency of first selection of a corresponding hyperlink in the respective position in the list of hyperlinks. Relevance engine 308 then adjusts the position of the search result in the list of search results based on the comparison.

In one embodiment, the average frequency of first selection of a hyperlink with respect to its position in the list of hyperlinks includes a global average frequency of the hyperlink to be selected first from the list of hyperlinks generated in response to any search query. The average frequency of first selection of a search result includes the average frequency of the search result to be selected first from the list of search results after generating the list of search results.

In one embodiment, statistical computation engine 304 collects statistical data on search results associated with the search term, and to compute the average frequency of first selection for each search result based on the collected statistical data. The statistical data can also include an order of the list of search results, an identification of which search results are selected, an order of a selection of search results, a time difference between each selection, the last search result to be selected from the list of search results, whether another query for another search term related to the original search term is subsequently performed within a relatively short time period after the original search.

In another embodiment, search engine 302 occasionally generates a list of search results in a random order so that statistical computation engine 304 updates the average frequency of first selection of each hyperlink with respect to its position in the list of hyperlinks based on a first selection of a search result from the other list. The statistical computation engine 304 also updates the average frequency of first selection of each search result from the list of search results based on the first selection of the search result from the random ordered list.

Figure 4:
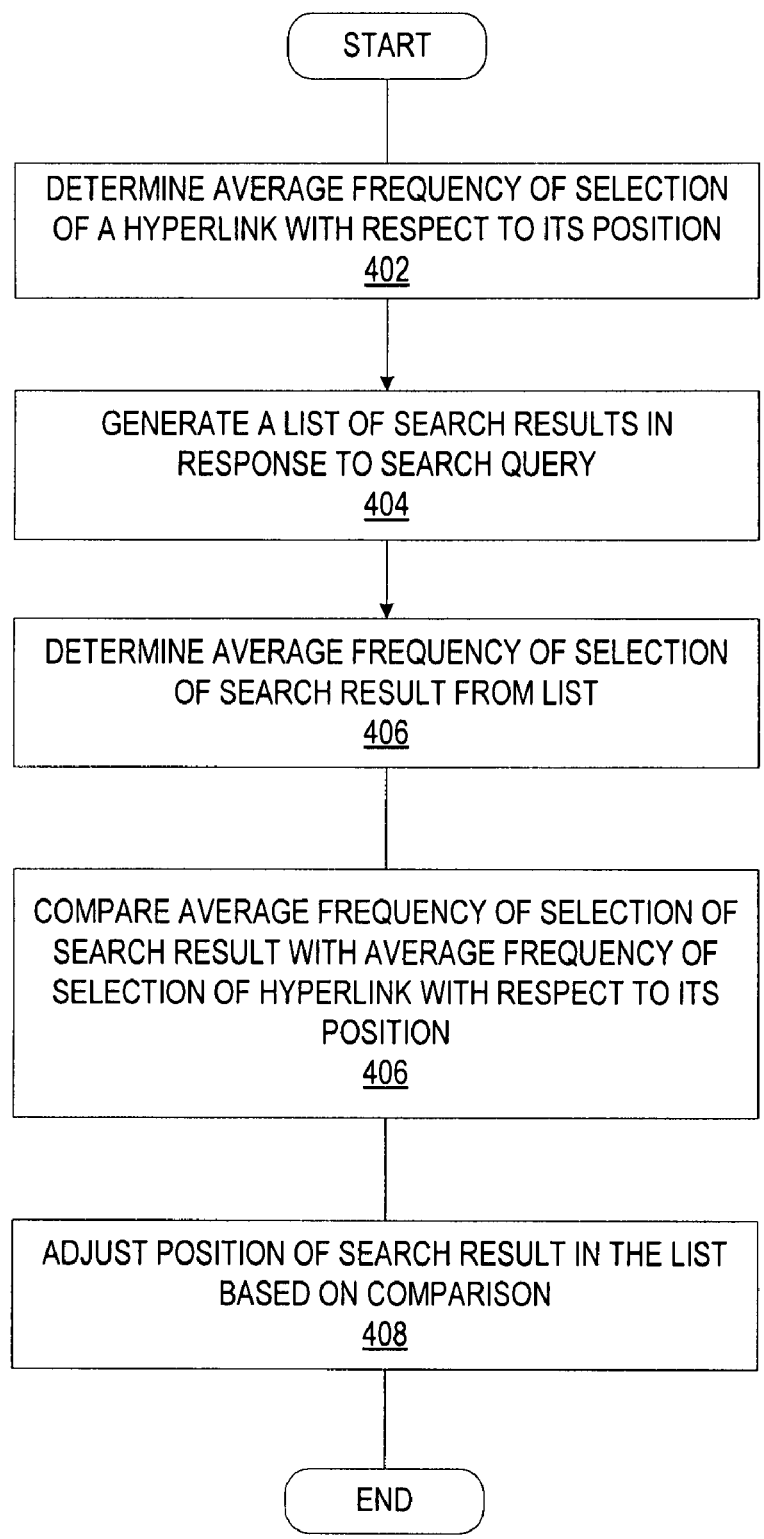
FIG. 4 is a flow diagram illustrating of one embodiment of a method for ranking search results.

FIG. 4 is a flow diagram illustrating of one embodiment of a method for ranking search results. At 402, a statistical computation engine determines an average frequency of first selection of a hyperlink with respect to its position in a list of hyperlinks based on statistics from data accumulated in a database. At 404, a search engine generates a list of search results in response to a query for a search term to the search engine.

At 406, the statistical computation engine determines an average frequency of first selection of a search result from the list of search results. In one embodiment, the statistical computation engine collects statistical data on search results associated with the search term, and computes the average frequency of first selection for each search result based on the collected statistical data. For example, the statistical data may include an order of the list of search results, an identification of which search results are selected, an order of a selection of search results, and a time difference between each selection. The statistical data may also include the last search result to be selected from the list of search results. Where multiple links were clicked, the last link clicked may be likely the most relevant. In accordance with another embodiment, the statistical data may also include whether another query for another search term related to the search term is subsequently performed after the original search.

At 408, a relevance engine compares the average frequency of first selection of the search result from the list of search results with the average frequency of first selection of a corresponding hyperlink in the respective position in the list of hyperlinks. At 410, the relevance engine adjusts the position of the search result in the list of search results based on the comparison.

In one embodiment, the average frequency of first selection of a hyperlink with respect to its position in the list of hyperlinks includes a global average frequency of the hyperlink to be selected first from the list of hyperlinks generated in response to any search query. The average frequency of first selection of a search result can include the average frequency of the search result to be selected first from the list of search results after generating the list of search results.

In another embodiment, the search engine may periodically generate another list of search results in a random order to both validate the relevance calculations and to collect statistics on very low ranked pages. As such, the average frequency of selection of each hyperlink with respect to its position in the list of hyperlinks can be updated based on selections or click-through in the list with random order.

Figure 5:
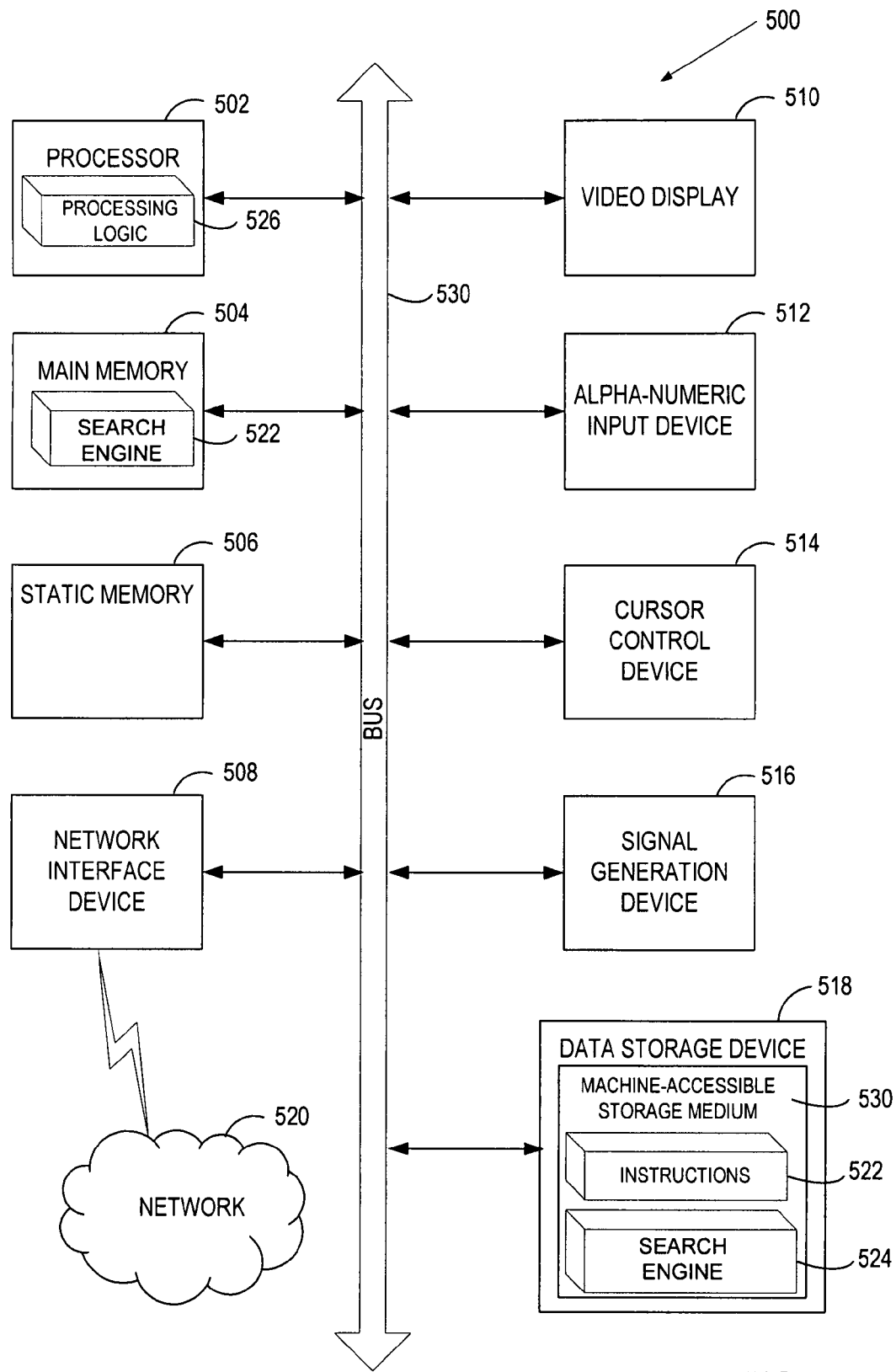
FIG. 5 is a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store a search engine module 524 for ranking web pages based on the socially-derived statistical analysis as described above. The search engine module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   determining an average frequency of first selection of a hyperlink with respect to its position in a list of hyperlinks;
   generating a list of search results in response to a query for a search term to a search engine;
   determining an average frequency of first selection of a search result from the list of search results;
   comparing the average frequency of first selection of the search result from the list of search results with the average frequency of first selection of a corresponding hyperlink in the respective position in the list of hyperlinks; and
   adjusting the position of the search result in the list of search results based on the comparison,
   wherein determining the average frequency of first selection of a search result further comprises collecting statistical data on search results associated with the search term and computing the average frequency of first selection for each search result based on the collected statistical data,
   wherein the statistical data comprise an order of the list of search results, an identification of which search results are selected, an order in which search results are selected among the list of search results, a time elapsed between a first selected search result and a second selected search result from the list of search results.

2. The method of claim 1 wherein the average frequency of first selection of a hyperlink with respect to its position in the list of hyperlinks includes a global average frequency of the hyperlink to be selected first from the list of hyperlinks generated in response to any search query.

3. The method of claim 1 wherein the average frequency of first selection of a search result includes the average frequency of the search result to be selected first from the list of search results after generating the list of search results.

4. The method of claim 1 wherein the statistical data comprises the last search result to be selected from the list of search results.

5. The method of claim 1 wherein the statistical data comprises another query for an other search term related to the search term.

6. The method of claim 1 further comprising:
periodically generating an other list of search results in a random order;
updating the average frequency of first selection of each hyperlink with respect to its position in the list of hyperlinks based on a first selection of a search result from the other list; and
updating the average frequency of first selection of each search result from the list of search results based on the first selection of the search result from the other list.

7. A non-transitory computer-accessible storage medium including data that, when accessed by a computer system, cause the computer system to perform a method comprising:
generating a list of search results in response to a query for a search term to a search engine;
determining an average frequency of first selection of a search result from the list of search results;
comparing the average frequency of first selection of the search result from the list of search results with the average frequency of first selection of a corresponding hyperlink in the respective position in the list of hyperlinks; and
adjusting the position of the search result in the list of search results based on the comparison,
wherein determining the average frequency of first selection of a search result further comprises collecting statistical data on search results associated with the search term and computing the average frequency of first selection for each search result based on the collected statistical data,
wherein the statistical data comprise an order of the list of search results, an identification of which search results are selected, an order in which search results are selected among the list of search results, a time elapsed between a first selected search result and a second selected search result from the list of search results.

8. The non-transitory computer-accessible storage medium of claim 7 wherein the average frequency of first selection of a hyperlink with respect to its position in the list of hyperlinks includes a global average frequency of the hyperlink to be selected first from the list of hyperlinks generated in response to any search query.

9. The non-transitory computer-accessible storage medium of claim 7 wherein the average frequency of first selection of a search result includes the average frequency of the search result to be selected first from the list of search results after generating the list of search results.

10. The non-transitory computer-accessible storage medium of claim 7 wherein the statistical data comprises the last search result to be selected from the list of search results.

11. The non-transitory computer-accessible storage medium of claim 7 wherein the statistical data comprises another query for an other search term related to the search term.

12. The non-transitory computer-accessible storage medium of claim 7 wherein the method further comprises:
periodically generating an other list of search results in a random order;
updating the average frequency of first selection of each hyperlink with respect to its position in the list of hyperlinks based on a first selection of a search result from the other list; and
updating the average frequency of first selection of each search result from the list of search results based on the first selection of the search result from the other list.

13. A computing system comprising:
a processing device comprising a search engine, a statistical engine, and a relevance engine, wherein the search engine is configured to generate a list of search results in response to a query for a search term to the search engineer wherein the statistical computation engine, coupled to the search engine, is configured to determine an average frequency of first selection of a hyperlink with respect to its position in a list of hyperlinks, and to determine an average frequency of first selection of the search result from the list of search results the relevance engine, coupled to statistical computation engine, is configured to compare the average frequency of first selection of the search result from the list of search results with the average frequency of first selection of a corresponding hyperlink in the respective position in the list of hyperlinks, and to adjust the position of the search result in the list of search results based on the comparison; and
a storage device coupled to the processing device, the storage device configured to store statistical data on search results associated with the search term, the statistical data comprising an order of the list of search results, an identification of which search results are selected, an order in which search results are selected among the list of search results, a time elapsed between a first selected search result and a second selected search result from the list of search results.

14. The computing system of claim 13 wherein the average frequency of first selection of a hyperlink with respect to its position in the list of hyperlinks includes a global average frequency of the hyperlink to be selected first from the list of hyperlinks generated in response to any search query.

15. The computing system of claim 13 wherein the average frequency of first selection of a search result includes the average frequency of the search result to be selected first from the list of search results after generating the list of search results.

16. The computing system of claim 13 wherein the statistical data comprises the last search result to be selected from the list of search results.

17. The computing system of claim 13 wherein the statistical data comprises another query for an other search term related to the search term.

18. The computing system of claim 13 wherein the search engine is configured to periodically generate an other list of search results in a random order, and the statistical computation engine is configured to update the average frequency of first selection of each hyperlink with respect to its position in the list of hyperlinks based on a first selection of a search result from the other list, and to update the average frequency of first selection of each search result from the list of search results based on the first selection of the search result from the other list.

* * * * *